United States Patent [19]
Maier

[11] 3,833,231
[45] Sept. 3, 1974

[54] CHUCK

[76] Inventor: Karl Maier, 186 Heide, Hallein, Austria

[22] Filed: Jan. 31, 1973

[21] Appl. No.: 328,413

[30] Foreign Application Priority Data
Feb. 1, 1972   Austria ................................ 793/72

[52] U.S. Cl. .............................................. 279/116
[51] Int. Cl. ............................................ B23b 31/16
[58] Field of Search ............ 279/116, 114, 115, 110

[56] References Cited
UNITED STATES PATENTS
1,181,845   5/1916   Church ............................. 279/116
1,219,439   3/1917   Church ............................. 279/115

*Primary Examiner*—Gil Weidenfeld
*Attorney, Agent, or Firm*—Kurt Kelman

[57] ABSTRACT

A front plate is formed in one surface with a first annular groove. A plurality of jaws are radially guided in said front plate. A cover plate has a surface which contacts said one surface and is formed with a second annular groove, which registers with said first annular groove. Screws connect said cover plate to said front plate. Said contacting surfaces of said front plate and cover plate lie in a single plane. Centering means are provided, which center said front plate and said cover plate relative to each other and consist only of a gear ring, which extends into said first and second annular grooves and is rotatably mounted therein and carries a scroll, which is in engagement with said jaws so that said gear ring is rotatable to radially adjust said jaws.

1 Claim, 1 Drawing Figure

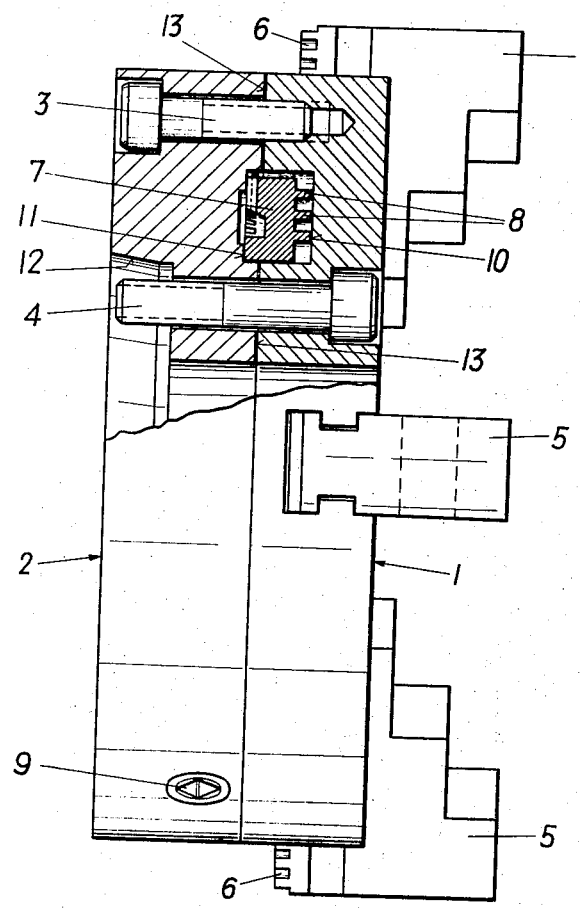

CHUCK

BACKGROUND OF THE INVENTION

This invention relates to a chuck, which comprises a front plate, in which jaws are radially guided, and a cover plate, which is connected to the front plate by screws, and a gear ring, which is provided with a scroll for radially adjusting the jaws and is rotatably mounted in an annular groove, which is formed in the front plate and covered by the cover plate, the mutually contacting surfaces of the front plate and cover plate lying in a single plane.

A chuck must meet special requirements as regards the centrally symmetrical mounting of the jaws in the chuck and as regards the central mounting of the chuck on a spindle because this is essential if a workpiece is to be turned to an exactly cylindrical shape. Besides, the overall height of the chuck should be minimised in order to reduce the weight and flywheel effect of the chuck so that the spindle can be reversed and braked more quickly. If the overall height is reduced, the workpiece can be positioned closer to the headstock so that the vibration of the workpiece and the stress of the spindle are reduced.

In view of these requirements, the known chucks, which must be secured to the spindle by a centering rim and a screw-threaded flange because these chucks have an excessively large overall height and an excessively strong flywheel effect for high-duty service. With a view to eliminating the disadvantages of these known chucks, other known chucks have been provided which comprise a front plate and a cover plate, which is connected to the front plate by screws. In the latter chucks, an exact positioning of the chuck on the spindle is ensured by means of a nose-engaging, tapered internal surface, which is integrally machined in the cover plate. The machining of the tapered internal surface in the cover plate enables a substantial reduction of the overall height and of the flywheel effect, with consequent advantages. The last-mentioned known chucks have the disadvantage, however, that it is difficult to ensure a centrally symmetrical guidance of the chuck relative to the axis of the spindle. It must be borne in mind that it is not sufficient to ensure an exact centering of the cover plate relative to the front plate but the gear ring for radially adjusting the jaws must also be exactly centered relative to the front plate so that an exact radial adjustment of the jaws relative to the axis of the spindle is enabled. In such chucks, an exact centering of the front plate and cover plate relative to each other is ensured in that the front plate comprises a centering rim, which engages a mating recess in the cover plate. The gear ring for radially adjusting the jaws is mounted in an annular groove, which at its inside circular surface must center and guide the gear ring. Because a double centering is required, the inaccuracies which are inevitable in the manufacture may add up in an adverse manner and may render the chuck unusable for special purposes.

The use of a centering rim for centering the cover plate relative to the front plate results in a further difficulty, which may also render the chuck unusable for special purposes. It will be understood that the centering rim must protrude from the remaining contact surface of the front plate. The end face of the centering rim is axially spaced from the remaining contact surface of the front plate, and exactly the same spacing must be maintained between the corresponding contact surfaces of the cover plate because otherwise there would be a risk of a bending of the front plate and/or cover plate when they are screwed together. Because the jaws are particularly exactly guided, such slight bending of the front plate may result in a clamping of the jaws in their guides or in a deformation of the nose-engaging, tapered internal surface in the cover plate so that the chuck is no longer usable.

Because the front plate is provided with a centering rim, additional disadvantages are involved in the manufacture of such chucks. This is due to the fact that the blank from which the front plate is forged must have relatively large allowances of material and the bearing bore for the pinion driving the gear ring can be drilled only when the front plate and cover plate have been screwed together. This is necessary because the pinion must be disposed adjacent to the parting line between the front plate and cover plate owing to the arrangement of the gear ring. For this reason, a subsequent machining of the contacting surfaces of the front plate and cover plate usually requires also a subsequent machining of the bearing bore for the pinion.

It is an object of the invention to avoid the disadvantages which have been pointed out and to provide a chuck which can easily be manufactured and ensures a particularly exact central mounting relative to the axis of rotation of the spindle.

In a chuck of the kind defined first hereinbefore, this object is accomplished by the invention in that the front plate and cover plate are centered relative to each other only by the gear ring, which engages also an annular groove in the cover plate. A particularly high dimensional stability is ensured because the front plate and cover plate are centered only by the gear ring, since the latter is guided also in the annular groove in the cover plate and the annular groove and the nose-engaging, tapered internal surface can be machined into the cover plate with high accuracy. Different from the known chucks, there is no double centering so that an additional source of error which reduces the required dimensional stability is eliminated. The centering of the front plate and cover plate by the gear ring enables also the use of a front plate and cover plate having a simpler configuration so that the mutually contacting surfaces of the front plate and cover plate may lie in a single plane, as is known per se. This special arrangement of the contacting surfaces in a single plane enables a machining of the front plate and cover plate with high accuracy and dimensional stability because the mutually contacting surfaces of the front plate and cover plate may be face-ground so that a snug contact between the cover plate and front plate is ensured. As a result, a bending of the front plate or cover plate as these parts are screwed together will be reliably avoided as well as the disadvantages resulting from such bending. Owing to the special arrangement of the gear ring the front plate and the cover plate can be completely manufactured individually because the pinion is mounted only in the cover plate.

The design according to the invention affords also the advantage that the storage will be facilitated as the nose-engaging, tapered internal surfaces, which differ in size in accordance with different standard specifications, can be machined into the cover plate even subsequently with a sufficiently high accuracy so that it is no longer required to keep a separate chuck in storage for each chuck diameter and for each standard specification for a nose-engaging, tapered internal surface.

An embodiment of the invention is represented by way of example on the accompanying drawing, which shows a chuck according to the invention partly in section.

The chuck which is shown comprises a front plate 1 and a cover plate 2, which are held together by screws 3, 4. The screws 4 may also serve to secure the chuck to a spindle. Three jaws 5 are radially guided in the front plate 1 and have teeth 6 in mesh with a scroll 8, which is provided on a gear ring 7. The latter can be driven by a pinion 9 so as to radially move the jaws 5.

To ensure a holding of the workpiece by the jaws 5 with the highest central symmetry relative to the axis of rotation of the spindle, the gear ring 7 must be centrally mounted relative to said axis of rotation to the highest possible degree. This is accomplished according to the invention in that the front plate 1 and the cover plate 2 are centered relative to each other only by the gear ring 7, which engages an annular groove 10 in the front plate 1 and an annular groove 11 in the cover plate 2. The nose-engaging, tapered internal surface 12 in the cover plate 2 must be an exact fit on the correspondingly shaped, frustoconical portion of the spindle nose, and this tapered internal surface 12 and the inner circular surface of the annular groove 11, which surface guides the gear ring, can be centrally machined into the cover plate with high dimensional accuracy. As a result, a centrally symmetrical, radial movement of the jaws 5 and a centered holding of the workpiece are ensured.

Because the gear ring itself is used for centering, there is no need for a separate centering rim so that the mutually contacting faces 13 of the front plate and cover plate may lie in a single plane. Owing to this simple design of the front plate and cover plate, the manufacture of the chuck with high dimensional accuracy is much facilitated because all mutually contacting surfaces 13 of the front plate and cover plate can be face-ground so that when the front plate and cover plate are forced together by the screws 3 and 4 these plates will be in snug contact with each other and cannot bend.

It will be apparent that the simple design of the chuck according to the invention ensures a simpler and less expensive manufacture. The desired accuracy can be further increased in comparison to known chucks. Because the front plate and cover plate can be made independently of each other, the storage will be facilitated because it is sufficient to keep one front plate and one cover plate in stock for a chuck having a given diameter. When the specification from the customer has been received, it will be sufficient to machine the desired nose-engaging, tapered internal surface into the cover plate, as contrasted with the known chucks, where an entire chuck must be kept in stock for each standard specification for a nose-engaging, tapered internal surface.

What is claimed is:
1. A chuck comprising
   1. a front plate having a surface defining an annular groove,
   2. a cover plate having a surface contacting the front plate surface and defining an annular groove in registry with the annular groove in the front plate surface,
      a. the contacting surfaces lying in a single plane,
   3. screws connecting the cover plate to the front plate,
   4. a plurality of jaws radially guided in the front plate,
      a. the jaws carrying teeth, and
   5. means centering the front and cover plates relative to each other, the centering means consisting solely of a gear ring held in the registering annular grooves and rotatably mounted therein,
      a. the gear ring carrying a scroll meshing with the teeth of the jaws for radial adjustment of the jaws by rotation of the ring.

* * * * *